United States Patent
Guillot

(10) Patent No.: US 9,873,520 B2
(45) Date of Patent: Jan. 23, 2018

(54) HIGH-VOLTAGE DIRECT CURRENT POWER SUPPLY SYSTEM FOR AN AIRCRAFT

(71) Applicant: SAFRAN ELECTRONICS & DEFENSE, Boulogne Billancourt (FR)

(72) Inventor: François Guillot, Boulogne Billancourt (FR)

(73) Assignee: Safran Electronics & Defense, Boulogne-Billancourt (FR)

( * ) Notice: Subject to any disclaimer, the term of this patent is extended or adjusted under 35 U.S.C. 154(b) by 0 days.

(21) Appl. No.: 15/500,753

(22) PCT Filed: Jul. 20, 2015

(86) PCT No.: PCT/EP2015/066586
§ 371 (c)(1),
(2) Date: Jan. 31, 2017

(87) PCT Pub. No.: WO2016/016041
PCT Pub. Date: Feb. 4, 2016

(65) Prior Publication Data
US 2017/0225798 A1    Aug. 10, 2017

(30) Foreign Application Priority Data
Jul. 31, 2014  (FR) ...................................... 14 57474

(51) Int. Cl.
*B64D 41/00* (2006.01)
*H02J 1/00* (2006.01)

(52) U.S. Cl.
CPC ................ *B64D 41/00* (2013.01); *H02J 1/00* (2013.01); *B64D 2221/00* (2013.01)

(58) Field of Classification Search
CPC ........ B64D 41/00; B64D 2221/00; H02J 1/00
USPC .................................................. 307/9.1, 10.1
See application file for complete search history.

(56) References Cited

U.S. PATENT DOCUMENTS

| 5,612,579 A | 3/1997 | Wisbet et al. |
| 5,899,411 A | 5/1999 | Latos et al. |

FOREIGN PATENT DOCUMENTS

| EP | 2015420 A2 | 1/2009 |
| EP | 2654154 A2 | 10/2013 |

*Primary Examiner* — Hal Kaplan
(74) *Attorney, Agent, or Firm* — Muncy, Geissler, Olds & Lowe, P.C.

(57) ABSTRACT

The invention provides an electrical power supply system for an aircraft, the system comprising: a first electrical power supply network (1) including a first alternator (10); a second electrical power supply network (2) including a second alternator (20); and secondary lines (40) united in at least a first group (41) such that they are connected via switches to a common first intermediate line (51), and in at least a second group (42) so as to be connected via switches to a common second intermediate line (52); the system including a control member (60) for controlling the electrical power supply networks, the control member being arranged to servo-control each of the alternators in current, the system being arranged in such a manner that the power supply outputs of the two electrical power supply networks are connected together prior to being connected to each intermediate line, each intermediate line thus being powered in parallel by the two electric power supply networks.

9 Claims, 2 Drawing Sheets

HIGH-VOLTAGE DIRECT CURRENT POWER SUPPLY SYSTEM FOR AN AIRCRAFT

The invention relates to a high voltage direct current (HVDC) electrical power supply system for an aircraft.

TECHNOLOGICAL BACKGROUND OF THE INVENTION

In order to reduce the fuel consumption of an aircraft, it is becoming more and more frequent to replace traditional devices that are driven by hydraulic energy or by pneumatic energy with novel devices that are driven by electrical energy.

With an aircraft operating mainly on the basis of electrical energy, numerous devices need to be able to access the electrical power supply system of said aircraft.

OBJECT OF THE INVENTION

An object of the invention is to propose a high voltage direct current electrical power supply system for an aircraft, which system presents very good availability.

BRIEF SUMMARY OF THE INVENTION

In order to achieve this object, the invention provides a high voltage direct current electrical power supply system for an aircraft, the system comprising at least:
 a first electrical power supply network including a first alternator;
 a second electrical power supply network including a second alternator; and
 secondary lines for electrically powering elements of the aircraft, the secondary lines being united in at least a first group so as to be connected via switches to a common first intermediate line, and in at least a second group so as to be connected via switches to a common second intermediate line;
 the system including a control member for controlling the electrical power supply networks, the control member being arranged to servo-control each of the alternators in current, the system being arranged in such a manner that the power supply outputs of the two electrical power supply networks are connected together prior to being connected to each intermediate line, each intermediate line thus being powered by the two electrical power supply networks and the two intermediate lines being powered in parallel.

By servo-controlling the various alternators in current, the alternators can power each intermediate line in parallel and can thus power each group of secondary lines.

It is thus possible for the control member to define a current control setpoint for each of the networks so that each network supplies electrical power at its output that is a function of the needs of the various groups of secondary lines and of the availabilities of each network, which may vary as a function of the operational state of the networks or indeed as a function of flight parameters, for example.

The overall electrical power supply system of the invention thus presents good availability since the control member acts on the presence of a plurality of networks and on connecting said networks in parallel so as to ensure that suitable electrical power is supplied to the secondary lines, even if there are variations in the availability specific to each network.

Advantageously, it is found possible to modify the way electrical power is supplied by each of the networks to the secondary lines in a manner that is progressive. This makes it possible to avoid jumps and disturbances in the electrical power supply system.

Furthermore, it is found advantageous to servo-control the alternators in current since the alternators operate naturally in current.

Furthermore, the failure rate of the power supply system of the invention is low since each group of secondary lines is connected to each of the available networks.

In addition, the power supply system of the invention makes it possible to minimize the noise generated by the networks.

BRIEF DESCRIPTION OF THE DRAWINGS

The invention can be better understood in the light of the following description of a particular, non-limiting embodiment of the invention. Reference is made to the accompanying figures, in which.

DETAILED DESCRIPTION OF THE INVENTION

Figure 1:
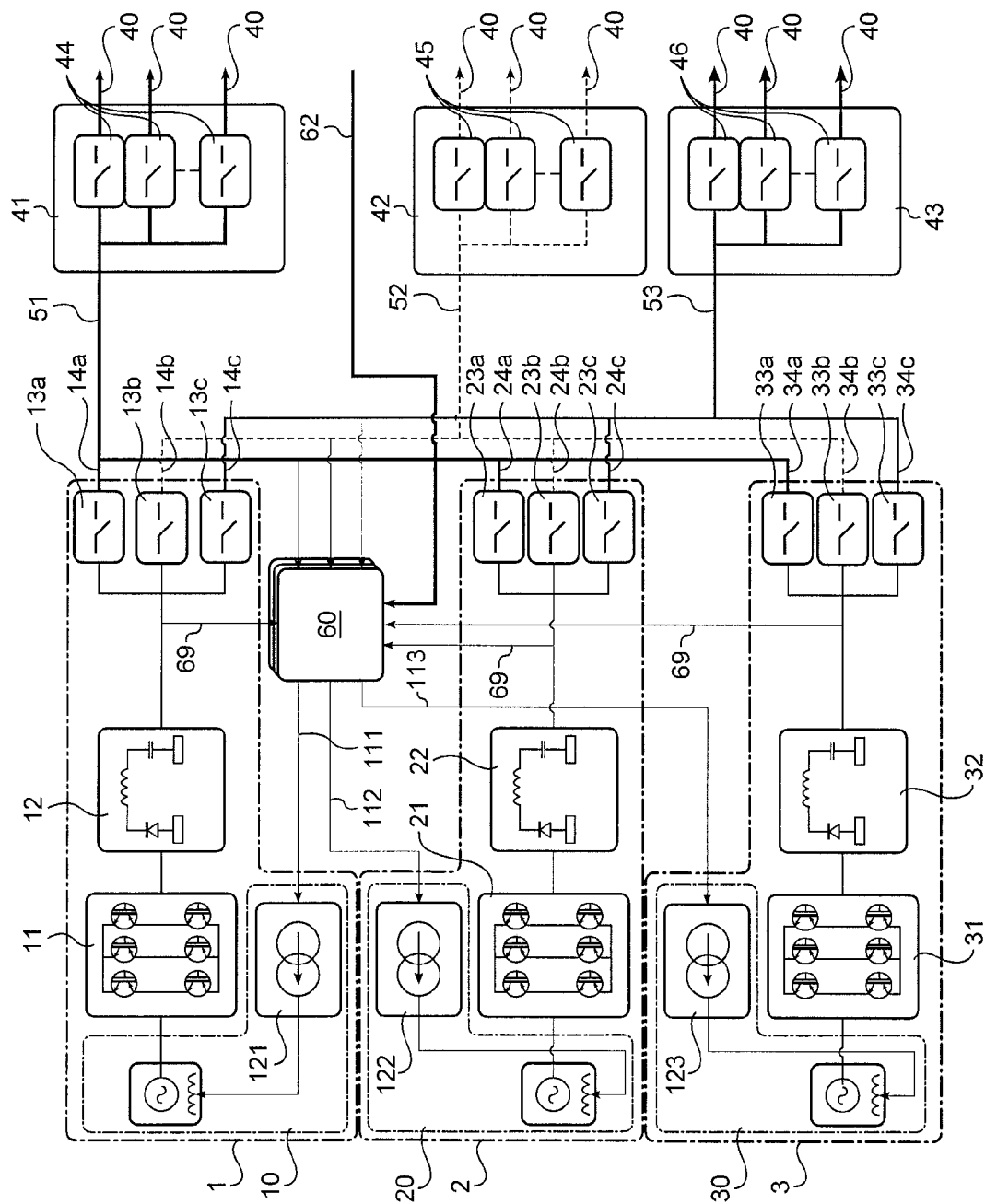
FIG. 1 is a diagram showing the electrical power supply system of the invention.
Figure 2:
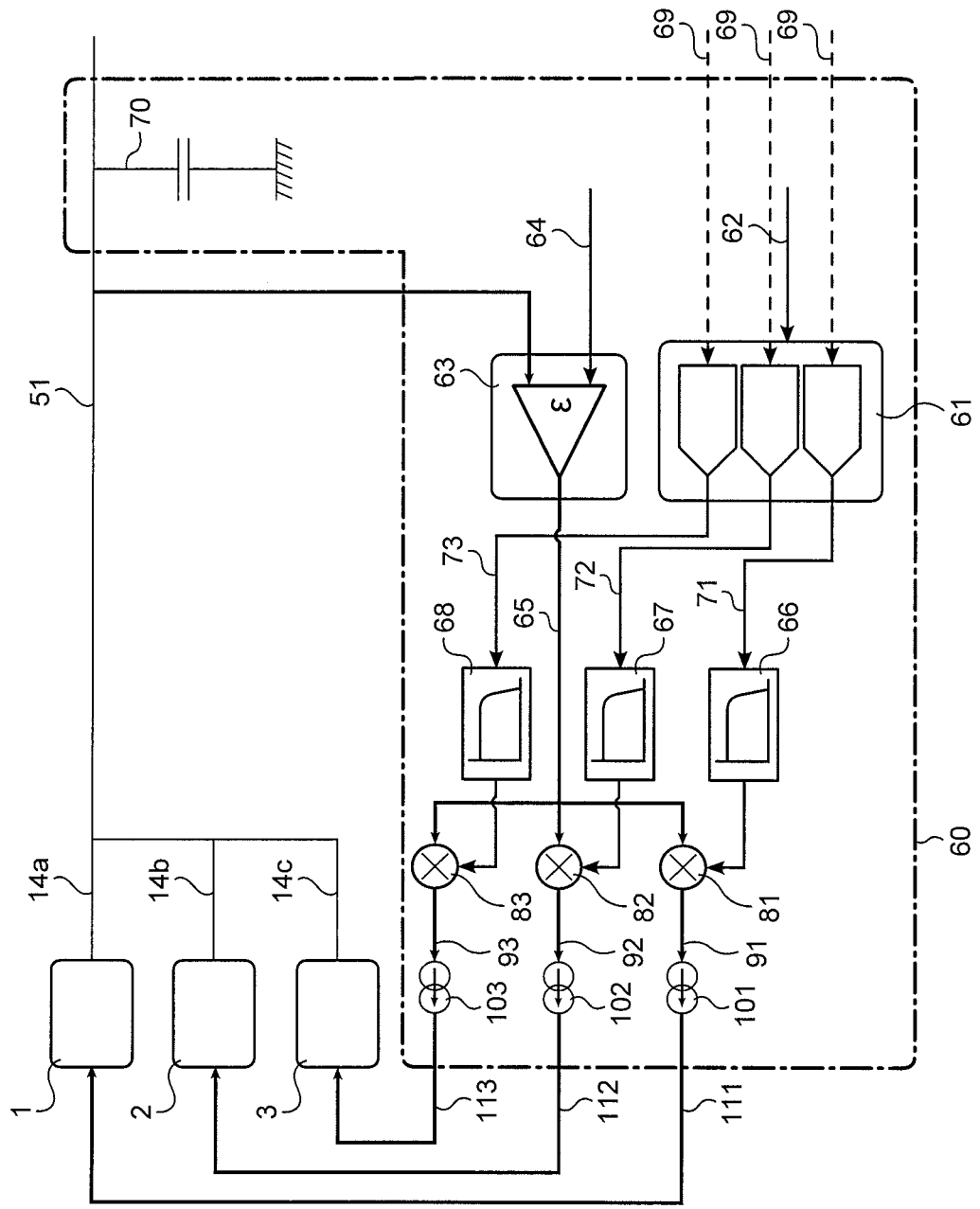
FIG. 2 is a diagram showing a portion of the system shown in FIG. 1, in greater detail.

With reference to FIG. 1, the HVDC electrical power supply system of the invention for an aircraft comprises in this embodiment:
 a first electrical power supply network 1 having a first alternator 10;
 a second electrical power supply network 2 having a second alternator 20; and
 a third electrical power supply network 3 having a third alternator 30.

Typically, the first alternator 10 is associated with a first main engine of the aircraft (not shown herein) with the first alternator 10 converting mechanical energy delivered by the first main engine into alternating current (AC) electrical energy. The second alternator 20 is associated with a second main engine of the aircraft (not shown herein), the second alternator 20 converting mechanical energy delivered by the second main engine into AC electrical energy. Finally, the third alternator 30 is associated with an auxiliary power unit (APU) of the aircraft (not shown herein), the third alternator 30 converting mechanical energy delivered by the APU into AC electrical energy. In this embodiment, all three alternators 10, 20, and 30 have electromagnets rather than permanent magnets. More precisely, all three alternators 10, 20, and 30 are controlled excitation three-phase alternators.

The first electrical power supply network 1 thus has the first alternator 10 connected to a first rectifier 11. The output from the first rectifier 11 is in turn connected to a first lowpass filter 12. The output from the first lowpass filter 12 is connected in parallel to three switches 13a, 13b, and 13c, respectively defining a first output 14a of the first network 1, a second output 14b of the first network 1, and a third output 14c of the first network 1.

Likewise, the second electrical power supply network 2 comprises the second alternator 20 connected to a second rectifier 21. The output from the second rectifier 21 is in turn connected to a second lowpass filter 22. The output from the second lowpass filter 22 is connected in parallel to three switches 23a, 23b, and 23c, respectively defining a first output 24*a* of the second network 2, a second output 24*b* of the second network 2, and a third output 24*c* of the second network 2.

Finally, the third electrical power supply network 3 comprises the third alternator 30 connected to a third rectifier 31. The output from the third rectifier 31 is in turn connected to a third lowpass filter 32. The output from the third lowpass filter 32 is connected in parallel to three switches 33*a*, 33*b*, and 33*c*, respectively defining a first output 34*a* of the third network 3, a second output 34*b* of the third network, and a third output 34*c* of the third network.

Furthermore, the electrical power supply system has a plurality of secondary lines 40 for electrically powering various elements of the aircraft. In this embodiment, the secondary lines are united in:
  a first group 41 such that each secondary line 40 of said group is connected in parallel via an associated switch 44 to a common first intermediate line 51;
  a second group 42 such that each secondary line 40 of said group is connected in parallel via an associated switch 45 to a common second intermediate line 52; and
  a third group 43 such that each secondary line 40 of said group is connected in parallel via an associated switch 46 to a common third intermediate line 53.

The system is also arranged in such a manner that the first output 14*a* of the first electrical power supply network 1, the first output 24*a* of the second electrical power supply network 2, and the first output 34*a* of the third electrical power supply network 3 are connected together prior to being connected to the first intermediate line 51. Because the three first outputs 14*a*, 24*a*, and 34*a* are connected together, the voltage across the terminals of the first intermediate line 51 is an HVDC voltage (for High Voltage Direct Current).

Likewise, the system is arranged in such a manner that the second output 14*b* of the first electrical power supply network 1, the second output 24*b* of the second electrical power supply network 2, and the second output 34*b* of the third electrical power supply network 3 are connected together prior to all of them being connected together to the second intermediate line 52. The voltage across the terminals of the second intermediate line 52 is thus an HVDC voltage.

In addition, the system is arranged in such a manner that the third output 14*c* of the first electrical power supply network 1, the third output 24*c* of the second electrical power supply network 2, and the third output 34*c* of the third electrical power supply network 3 are connected together prior to all of them being connected to the third intermediate line 53. The voltage across the terminals of the third intermediate line 53 is an HVDC voltage.

Thus, each intermediate line 51, 52, and 53 is powered by all three electrical power supply networks 1, 2, and 3. In addition, the three intermediate lines 51, 52, and 53 are powered in parallel by said electrical power supply networks 1, 2, and 3. The switches 44, 45, and 46 of the various groups 41, 42, and 43 of secondary lines then enable electrical power to be redistributed to the various elements.

The system also has a control member 60 for controlling the three electrical power supply networks 1, 2, and 3. The control member 60 is thus arranged to servo-control each of the three alternators 10, 20, and 30 in current. This current servo-control serves to make it very easy to connect the three alternators 10, 20, and 30 in parallel, and thus the three networks 1, 2, and 3, in parallel.

The control member 60 thus has reception means 61 for receiving a distribution setpoint 62 for distributing the electrical power to be supplied to the intermediate lines 51, 52, and 53 by each electrical power supply network 1, 2, and 3. By way of example, the distribution setpoint 62 is issued by an on-board computer of the aircraft. The reception means 61 are configured to decouple the distribution setpoint 62 into:
  a first setpoint 71 for the first electrical power supply network 1;
  a second setpoint 72 for the second electrical power supply network 2; and
  a third setpoint 73 for the third electrical power supply network 3.

The reception means 61 are configured so that the first setpoint 71, the second setpoint 72, and the third setpoint 73 are all in the form of a percentage (lying in the range 0 to 100%) corresponding to the electrical power that is to be supplied by the corresponding electrical power supply network to the various intermediate lines 51, 52, and 53, and in such a manner that the sum of the first setpoint 71 plus the second setpoint 72 plus the third setpoint 73 is always 100%.

The control member includes means for measuring the voltages across the terminals of the three intermediate lines 51, 52, and 53. The voltages across the terminals of the various intermediate lines 51, 52, and 53 are identical and equal to the HVDC voltage, so multiple measurements are therefore taken for reasons of redundancy.

The control member 60 has comparator means 63 for comparing the voltage measured across the terminals of any one of the intermediates lines 51, 52, or 53, e.g. across the terminals of the first intermediate line, with a reference threshold voltage 64. The comparator means 63 amplify the error between the measured voltage and the reference voltage 64 and supply an amplified error 65 to the input of a first multiplier 81 of the control member 60, to the input of a second multiplier 82 of the control member 60, and to the input of a third multiplier 83 of the control member 60.

The first multiplier 81 multiplies said amplified error 65 by the first setpoint 71, after passing the first setpoint 71 through a lowpass filter 66 of the control member 60, so as to generate a first voltage control setpoint 91 for the first electrical power supply network 1. The control member 60 also has a first voltage-to-current converter 101 connected to the first multiplier 81 so as to transform said first voltage control setpoint 91 into a first current control setpoint 111 that is transmitted directly to the first alternator 10. More precisely, the first current control setpoint 111 is transmitted to the power supply generator 121 of the excitation winding of the first alternator 10.

Likewise, the second multiplier 82 multiplies said amplified error 65 by the second setpoint 72 after passing the second setpoint 72 through a lowpass filter 67 of the control member 60 so as to generate a second voltage control setpoint 92 for the second electrical power supply network 2. The control member 60 also has a second voltage-to-current converter 102 connected to the second multiplier 82 so as to transform said second voltage control setpoint 92 into a second current control setpoint 112 that is transmitted directly to the second alternator 20. More precisely, the second current control setpoint 112 is transmitted to the power supply generator 122 of the excitation winding of the second alternator 20.

Likewise, the third multiplier 83 multiplies said amplified error 65 by the third setpoint 73 after passing the third setpoint 73 through a lowpass filter 68 of the control member in order to generate a third voltage control setpoint 93 for the third electrical power supply network 3. The control member 60 also has a third voltage-to-current converter 103 connected to the third multiplier 83 so as to transform said third voltage control setpoint 93 into a third current control setpoint 113 that is transmitted directly to the third alternator 30. More precisely, the third current control setpoint 113 is transmitted to the power supply generator 123 of the excitation winding of the third alternator 30.

As a result, depending on the distribution setpoint 62 and on the measured voltage, the control member 60 serves to generate current control setpoints 111, 112, and 113 for each of the alternators 10, 20, and 30 of the three electrical power supply networks 1, 2, and 3. The control member 60 thus uses a servo-control loop having as inputs the distribution setpoint 62 and the measured voltage, and having as outputs the three current control setpoints 111, 112, and 113.

Furthermore, the filtering of the first setpoint 71, of the second setpoint 72, and of the third setpoint 73 by a respective lowpass filter 66, 67, or 68 serves to avoid changes to the setpoints giving rise to disturbances in the above-described servo-control loop.

In addition, causing the alternators 10, 20, and 30 to operate under current control makes it possible to avoid problems of drift in the characteristics of the excitation windings of said alternators 10, 20, and 30.

Preferably, the control member 60 has means for detecting excess voltage on each of the electrical power supply networks 1, 2, and 3 so as to provide indications 69 of any excess voltage in the various networks 1, 2, and 3 to the control member 60.

The control member 60 can thus adapt the various setpoints 71, 72, and 73 so as to avoid the excess voltage lasting in any of the associated networks 1, 2, and 3.

Preferably, the control member 60 has a capacitor 70 with the voltage across its terminals being the HVDC voltage, the capacitor 70 being arranged at the input of the control member 60. The role of the capacitor 70 is to assist in stabilizing said HVDC voltage during current transients and also to assist in stabilizing the above-described servo-control loop.

Preferably, the control member 60 servo-controls the three alternators 10, 20, and 30 in current so that it is the first network 1 and the second network 2, i.e. the networks that are associated with the main engines, that supply electrical power as a priority to the various intermediate lines 51, 52, and 53, with the third network 3 acting as an adjustment variable when the first network 1 and the second network 2 cannot on their own supply the electrical power to the various intermediate lines 51, 52, and 53.

Thus, by means of the invention, the control member 60 performs servo-control that makes it possible to distribute the supply of electrical power by each of the networks 1, 2, and 3 in a manner that is dynamic as a function in particular of the availability of each network 1, 2, and 3.

By means of these three distinct networks 1, 2, and 3, and by means of the various switches 13a, 13b, 13c, 23a, 23b, 23c, 33a, 33b, and 33c, it is possible to decide which electrical power supply network 1, 2, and 3 is to power each of the groups 41, 42, and 43 of secondary lines, and in what proportions. Nevertheless, it is preferable to ensure that any modification to the power delivered by each of the networks 1, 2, and 3 to the intermediate lines 51, 52, and 53 is modified progressively by the control member 60 whenever it opens one or more switches 13a, 13b, 13c, 23a, 23b, 23c, 33a, 33b, and 33c, so as to avoid generating any disturbances in the system.

Naturally, the invention is not limited to the embodiment described, and embodiment variants may be applied thereto without going beyond the ambit of the invention as defined by the claims.

In particular, although the power supply system described has three electrical power supply networks, each having only one alternator, the electrical power supply system could have some other number of alternators, providing it has at least two.

The invention claimed is:

1. A high voltage direct current electrical power supply system for an aircraft, the system comprising at least:
   a first electrical power supply network including a first alternator;
   a second electrical power supply network including a second alternator; and
   secondary lines for electrically powering elements of the aircraft,
   wherein the secondary lines are united in at least a first group so as to be connected via switches to a common first intermediate line, and in at least a second group so as to be connected via switches to a common second intermediate line; and
   wherein the system includes a control member for controlling the electrical power supply networks, the control member being arranged to servo-control each of the alternators in current, the system being arranged in such a manner that first power supply outputs of the two electrical power supply networks are connected together prior to being connected to the first intermediate line and so that second power supply outputs of the two electrical power supply networks, distinct from the first outputs, are connected together prior to being connected to the second intermediate line, each intermediate line thus being powered by the two electrical power supply networks and the two intermediate lines being powered in parallel.

2. The system according to claim 1, wherein the control member includes reception means for receiving a distribution setpoint for the electrical power to be supplied to the intermediate line by each electrical power supply network and for receiving a measurement of voltage across the terminals of at least one of the intermediate lines, the control member being configured to generate current control setpoints for each of the alternators as a function of said distribution setpoints and of said voltage measurement.

3. The system according to claim 2, wherein the control member also includes detector means for detecting excess voltage in each of the electrical power supply networks and in communication with the control member.

4. The system according to claim 2, wherein the reception means decouple the distribution setpoint into a first setpoint for the first network and a second setpoint for the second network.

5. The system according to claim 4, wherein the control member has two multipliers, the first multiplier being configured to multiply the first setpoint by an error between the voltage measurement and a threshold voltage, and the second multiplier being configured to multiply the second setpoint by said error between the voltage measurement and the threshold voltage.

6. The system according to claim 5, wherein the control member includes a first voltage-to-current converter connected to the output from the first multiplier, and a second voltage-to-current converter connected to the output of the second multiplier.

7. The system according to claim 1, wherein each electrical power supply network comprises one of the first or the second alternators, a rectifier connected to the first or the second alternator, a lowpass filter connected to the rectifier, and at least two switches connected in parallel to the lowpass filter, the outputs from the switches being connected to respective ones of the intermediate lines.

8. The system according to claim 1, wherein one of the alternators is connected to an auxiliary power unit of the aircraft.

9. The system according to claim 1, having three electrical power supply networks, each having an alternator, the secondary lines being united in three groups, each connected to a common intermediate line via switches, the system being arranged in such a manner that each intermediate line is powered in parallel by each of the three electrical power supply networks.

\* \* \* \* \*